UNITED STATES PATENT OFFICE.

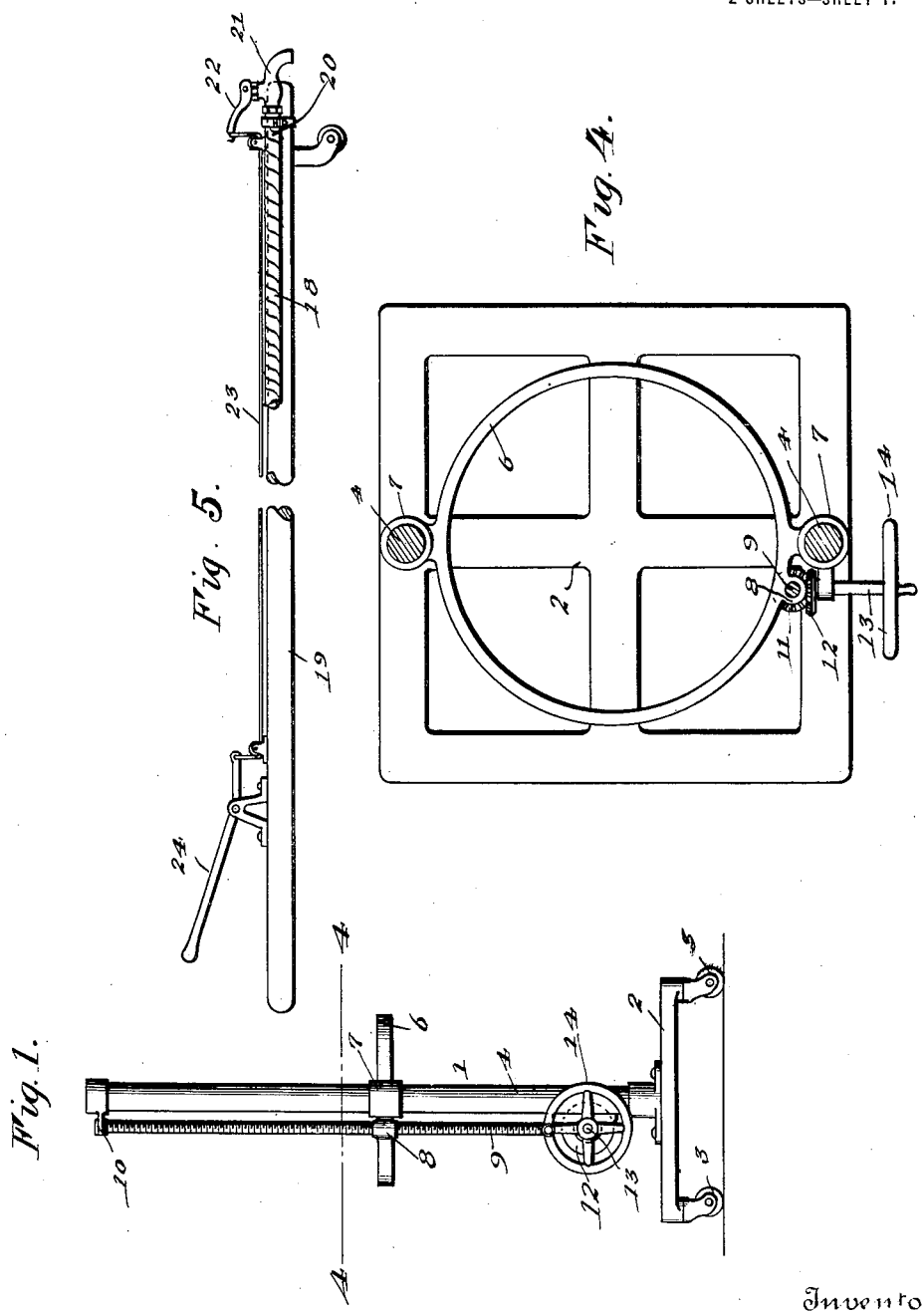

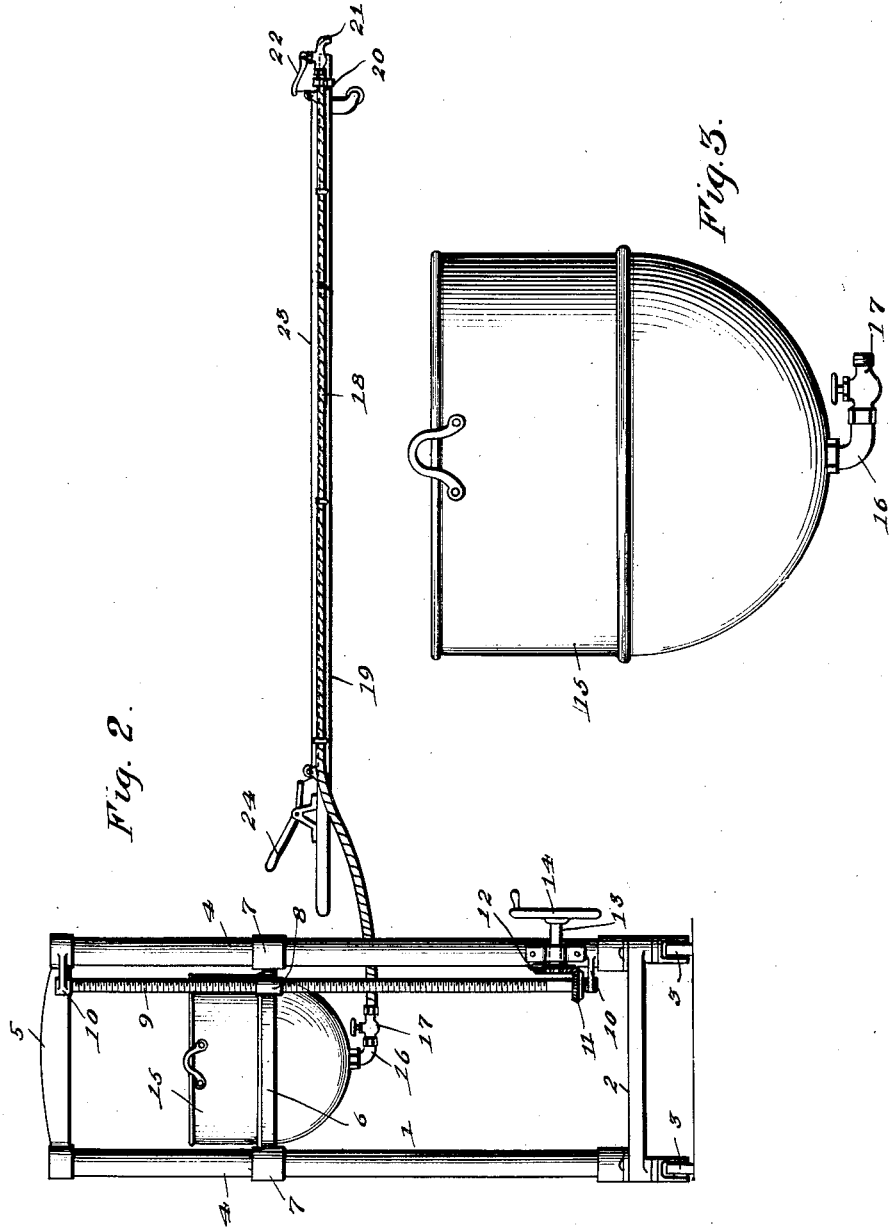

NICKOLAS DERTOUZOS, OF PRINCETON, NEW JERSEY.

FILLING-MACHINE.

1,325,437.  Specification of Letters Patent.  Patented Dec. 16, 1919.

Application filed June 2, 1919. Serial No. 301,146.

*To all whom it may concern:*

Be it known that I, NICKOLAS DERTOUZOS, a citizen of Greece, who have declared my intention to become a citizen of the United States, residing at Princeton, in the county of Mercer and State of New Jersey, have invented new and useful Improvements in Filling-Machines, of which the following is a specification.

This invention relates to an improvement in filling machines, designed particularly for bakers' use, and adapted to permit a single operator to fill a large number of pies or the like in a simple expeditious and sanitary manner.

Ordinarily pie filling is done by hand, requiring the baker to fill his container from the source of supply and then deliver the material from the container to the pie. With a large number of pies to fill, as in the ordinary bakery, this operation requires considerable time, and necessarily results in more or less wastage of the material through filling.

The present invention is designed to provide a can container adapted to contain a large supply of material, and mounted so that it may be readily removed from place to place. A conveying means of considerable length is adapted for detachable connection with the container, and the outlet from such conveyer is controlled by the operator. With such can filling machine, it is possible for the operator to fill a large number of pies, by simply moving the discharge end of the conveyer from one side to the other, without wastage or loss of time. Furthermore, through the use of this filling machine, the pies baked within the oven may be reached for filling, and the labor incident to this operation in the usual hand filling entirely avoided.

In the drawings:—

Figure 1 is a view in elevation of the improved filling machine, the bowl and conveyer being omitted;

Fig. 2 is a side elevation of the same, with the bowl and conveyer in place;

Fig. 3 is an elevation of the bowl removed;

Fig. 4 is a side elevation of the conveyer;

Fig. 5 is a detail of the means for controlling the outlet from the conveyer.

The improved filling machine comprises a main frame 1, including a base 2, mounted upon casters 3, from which base rises uprights 4, connected at their upper ends by a brace bar 5. A bowl ring 6 is connected to sleeves 7, slidably mounted upon the upright 5, and this ring 6 has an offset 8, formed with a threaded bore to coöperate with a threaded rod 9. The rod is rotatably mounted in upper and lower bearings 10, and is provided near its lower end with a beveled gear 11, adapted to mesh with a gear 12, mounted upon a shaft 13, rotatably supported in an offset from the main frame. The shaft 13 is operated from a hand wheel 14, whereby the rod 9 may be rotated, and the ring raised or lowered as desired.

A bowl 15 is provided, of suitable capacity, and preferably formed to seat within and be sustained by the ring 6. This bowl has a pipe outlet 16, provided with a hand controlled valve 17, whereby the entire contents of the bowl may be discharged through said outlet.

The conveyer comprises a tube 18, preferably metallic, formed at one end for coöperation with the end of an outlet 16 from the bowl, such conveying tube being connected for the greater portion of its length to a rod 19, serving as a hand rod for manipulating the conveyer. The discharge end 20 of the conveyer tube is adapted to be controlled by a spring operated valve 21, and this valve is provided with opening means including a lever 22, and a flexible connection 23, leading from the lever 22 to a hand lever 24 pivotally supported upon the rod 19 adjacent the inner end of the latter. The discharge valve 21 may be opened through manipulation of the hand lever 24, said valve being closed by the spring pressure, when said hand lever 24 is released.

In use, the ring 6 is lowered, and the bowl 15 filled with the desired quantity of material is placed within the ring, and the conveyer tube 18 connected to the outlet 16 from the bowl. The valve 17 is then opened to permit the contents from the bowl to flow into the conveyer, being prevented from discharge from the latter by the closed valve 21. The hand wheel 14 is then operated to elevate the ring 6, and with it the bowl, in order to give the desired gravity flow to the material. The operator through manipulating the rod 23, may direct the discharge end 20 of the conveyer over a pie or pies in succession, controlling the flow of material thereto by manipulation of the hand lever 24.

The improved device will therefore permit the baker to fill any number of pies in a simple, expeditious and sanitary manner, as wastage is practically prevented, and no foreign material permitted to enter the pie with the filling. Of course, the device is adapted to be readily moved from place to place, and this convenience, is contemplated for any use in which a large quantity of material is desired to be removed from place to place and used at will.

Having thus described the invention what is claimed is:—

1. A filling machine comprising a movable frame, a bowl ring slidably mounted thereon, a bowl removably fitted in said ring, and a conveyer leading from the bowl.

2. A filling machine comprising a frame mounted upon casters, a bowl ring slidably mounted on said frame, means for elevating the bowl ring with respect to the frame, a bowl adapted to fit said ring, and a conveyer having removable connection with said bowl, said conveyer having a valve discharge.

3. A filling machine comprising a frame, a bowl ring slidably mounted on said frame, means for elevating said ring, a bowl removably fitted in and supported by said ring, a conveyer leading from said bowl, and a rigid member to which the conveyer is connected, whereby the discharge end of the conveyer may be accurately positioned from a point remote from said discharge end.

4. A filling machine comprising a frame, a bowl receiving ring slidably mounted thereon, means for elevating said ring with respect to said frame, a bowl adapted to seat within and be supported by said ring, a conveyer movably connected with said bowl and having a valve discharge, a rod to which said conveyer is connected for handling the discharge end of said conveyer, and valve means mounted on the rod remote from the valve discharge end.

In testimony whereof I affix my signature.

NICKOLAS DERTOUZOS.